(12) United States Patent
Hein et al.

(10) Patent No.: US 6,466,250 B1
(45) Date of Patent: Oct. 15, 2002

(54) SYSTEM FOR ELECTRONICALLY-MEDIATED COLLABORATION INCLUDING EYE-CONTACT COLLABORATORY

(75) Inventors: Cheryl M. Hein, Los Angeles, CA (US); Craig A. Lee, Los Angeles, CA (US); Michael D. Howard, Westlake Village, CA (US); Tamara Lacker, Boston, MA (US); Michael J. Daily, Thousand Oaks, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/497,748

(22) Filed: Feb. 4, 2000

Related U.S. Application Data

(60) Provisional application No. 60/147,879, filed on Aug. 9, 1999.

(51) Int. Cl.$^7$ .................................................. H04N 7/14
(52) U.S. Cl. ............................ 348/14.16; 348/14.08; 348/14.09
(58) Field of Search .......................... 348/14.01, 14.03, 348/14.07, 14.08, 14.09, 14.1, 14.11, 14.12, 14.16; 379/93.17, 93.21, 202; 709/204, 205; 345/330; 370/260; 382/118

(56) References Cited

U.S. PATENT DOCUMENTS

| | | | | |
|---|---|---|---|---|
| 4,975,960 A | * | 12/1990 | Petajan ........................ | 381/43 |
| 5,689,641 A | * | 11/1997 | Ludwig et al. ............. | 370/260 |
| 5,889,549 A | * | 3/1999 | Yasuda et al. ............ | 348/14.01 |
| 5,889,843 A | * | 3/1999 | Singer et al. ................ | 379/202 |
| 6,047,288 A | * | 4/2000 | Kurosawa et al. ............. | 707/9 |
| 6,072,463 A | * | 6/2000 | Glaser ........................ | 345/753 |
| 6,292,166 B1 | * | 9/2001 | Palmer et al. ............... | 345/150 |

FOREIGN PATENT DOCUMENTS

| | | | | |
|---|---|---|---|---|
| EP | 0574138 A1 | * | 12/1993 | ............ H04N/7/15 |
| JP | 362053082 A | * | 3/1987 | ............ H04N/7/14 |
| JP | 363247975 A | * | 10/1989 | ........... G11B/20/12 |
| JP | 405083703 A | * | 4/1993 | ............ H04N/7/14 |
| JP | 405207459 A | * | 8/1993 | ............ H04N/7/15 |
| JP | 406113336 A | * | 4/1994 | .......... H04N/13/00 |
| JP | 406178326 A | * | 6/1996 | .......... H04N/13/00 |
| JP | 408298654 A | * | 11/1996 | ............ H04N/7/15 |
| JP | 409154114 A | * | 6/1997 | ............ H04N/7/15 |
| JP | 409162995 A | * | 6/1997 | ............ H04M/3/56 |
| JP | 409198227 A | * | 7/1997 | ............. G06F/3/14 |
| JP | 411055641 A | * | 2/1999 | ............ H04N/7/14 |
| JP | 411088529 A | * | 3/1999 | .......... H04M/11/00 |

\* cited by examiner

Primary Examiner—Melur Ramakrishnaiah
(74) Attorney, Agent, or Firm—V. D. Duraiswamy; M. W. Sales

(57) ABSTRACT

A system and method for producing and receiving electronically-mediated collaboration is presented. The electronically-mediated collaboration system and method include a high-fidelity audio system as well as application and cursor sharing, and a session manager module to synchronize among participants. In one embodiment, the system includes an eye contact collaboratory that manipulates video and eye position input to synthesize virtual camera images which simulate ordinary gaze behavior in a collaboratory system. An audio component optionally spatializes the voices of the participants to appear to coincide with their images.

17 Claims, 13 Drawing Sheets

SYSTEM FOR ELECTRONICALLY-MEDIATED COLLABORATION INCLUDING EYE-CONTACT COLLABORATORY

CROSS-REFERENCE TO RELATED APPLICATIONS

This applications claims benefit of Provisional Patent Application Ser. No. 60/147,879, entitled "SYSTEM FOR ELECTRONICALLY-MEDIATED COLLABORATION INCLUDING EYE-CONTACT COLLABORATORY," by Cheryl Hein, Craig Lee, Mike Howard, Tamara Lackner, and Mike Daily, filed on Aug. 9, 1999, which application is hereby incorporated by reference herein.

BACKGROUND OF THE INVENTION

1. Field of the Invention

The present invention generally relates to systems creating a virtual collaboration environment and more particularly to electronically-mediated systems for enhancing effective collaboration among participants.

2. Description of the Related Art

Co-located people collaborate by talking and showing documents to each other. Collaboration tools are used to facilitate a similar interaction between people separated by long distances. Existing collaboration tools are not very effective at achieving this goal.

Altom et al. U.S. Pat. No. 5,627,978, issued May 6, 1997, discloses a graphical user interface for multimedia call setup and call handling in a virtual conferencing system. This patent describes a system and method for presenting participants in an electronically mediated collaboration session. It presents users appearing to come and go from the conference, and the number of participants. The system is limited, however, as it does not couple the audio component to visual indicators as to which speaker is talking or implement shared applications and cursors.

Existing tools which link users via the Internet TCP/IP protocol possess inadequate audio fidelity, an absence of spatialized audio, limited application sharing and a limited number of allowable participants. Additionally, a significant missing feature of existing related art is the ability to effectively facilitate eye contact behavior.

Eye contact or gaze behavior is such an important component of human nonverbal communication that it is the subject of countless studies by scientists from many disciplines, ranging from psychology to anthropology. Mutual gaze is an established metric for communication quality in the experimental practices across disciplines. Clearly, using a communication system which degrades the participants' ability to engage in natural mutual gaze behavior will be less effective than face-to-face communication. Any system capable of supporting high-quality human interaction in virtual collaboration systems, approaching (or even surpassing) that of ordinary, co-located interactions, must be able to support natural mutual-gaze behavior. Video-based teleconferencing technologies in general, fail to support eye contact between participants. When a video camera produces images from a fixed location and transmits these images to other participants, the images are displayed from the point of view of the camera. To appear to make eye contact with a viewer who receives an image from a given camera, the participant being recorded would need to look directly at the camera and not at the eyes of the video representation of the remote viewer. Thus, the only way to support eye contact in such a system would be to make the camera coincident with the eyes of the video representation of the remote participant.

Conventional video teleconferencing, network-based desktop video teleconferencing and more recent video-based telecollaboration systems all suffer from the limitation that a participant gazing at the eyes of the video representation of another participant appears to that participant to be gazing away to a point in space. This effect corresponds to the geometric mismatch between the camera position and that of the participant's eyes in the video representation. In a typical desktop setup, the camera is mounted on the top edge of the monitor producing a view to the remote viewer of the participant appearing to look down, as at the desktop or keyboard. In fact, the participant is actually making eye contact with the video representation of the remote viewer displayed on the participant's monitor.

Previous attempts to develop systems which support eye contact were based upon developing a virtual camera, through optical components (half-silvered mirrors, etc.) and configuring it at a predetermined gaze location. A major limitation of such systems is that the virtual camera location is fixed by the geometric arrangement of the participants' viewing stations. Even slight movement of the participants causes the mutual gaze effect to break down in these systems. Further, such systems do not easily scale to multiple remote participants. Even if such previous approaches are extended by mechanizing the cameras and tracking participants' heads to allow repositioning of the cameras as the participants' head moves, such an approach would be inferior to the approach described here in many respects. Most importantly, lags in camera motion may be discernible and the system would not scale well to multiple users.

With respect to eye contact collaboration, some related art includes video teleconferencing technology, picture telephone technology, desktop video telecollaboration technology and video collaboration technology. Only one of these technologies, the approximately 20-year-old picture phone which supported only one-to-one conversation, produced some level of natural eye contact.

The deleterious effects of noise due to limited bandwidth on the recognition of speech sounds have been long known. See Miller, G.A. and Nicely, P.E. (1955), "An analysis of perceptual confusions among some English consonants," Journal of the Acoustical Society of America 27, 338–352. Recently, improved error measures for recognition of natural speech over toll-quality telephone provide a method of testing high-fidelity speech transmissions. See Spiegel, M. F. et al. (1990), "Comprehensive assessment of the telephone intelligibility of synthesized and natural speech," Speech Communication 9, 279–291. These studies demonstrate the need for improved sound quality beyond that provided by toll-quality telephone service to enhance communication.

SUMMARY OF THE INVENTION

The present invention enables people at geographically dispersed sites to collaborate more effectively (for certain types of sessions) than even a face-to-face meeting, by organizing and effectively presenting the audio and visual content of a collaboration session. In addition, the system may optionally include eye contact collaboration to further facilitate effective communication.

The features of this invention represent a novel and effective collaboration environment. The invention allows users running coordinating applications on their computers to collaborate in various modes, for example, by conversing via high fidelity audio, or by sharing personal data and documents, or by using shared applications.

The invention includes an array of audio and visual collaboration enhancements. Each participant's speech is captured at high fidelity and multicast to other participants. Participants may also hold conversations on participant-selectable channels, including private channels. Audio can optionally be "spatialized" to make participant voices appear to be located at the image of the speaker. Also, visual representations of each participant include indicators for identifying when a participant is talking. In addition, participant data or other information may optionally be displayed. The application can support multiple users, limited only by the audio processing hardware and space on the monitor.

The invention also encompasses a group of application sharing features. With shared applications, such as a shared whiteboard or browser, when one user makes a change to the application, all users see the change. The shared browser is particularly useful, as it can display any data available on the world-wide-web, and is innately capable of presenting data and controls from a wide variety of applications. Further, a shared cursor behaves like a shared application with some indicator as to which user is currently controlling it. Alternately, a number of cursors may be presented, optionally displayed by each user.

One embodiment of the present invention enables participants in a virtual collaboration session, using video representations, to make eye contact with other participants. This part of the invention consists of a system of display devices, cameras, optical components, computers, optional sensors, and image processing and control software. Each participant or viewer uses a special display device which presents video images of the other participants arranged in a viewer-selectable pattern within the displayed field of view, determining each participant's virtual location as seen by every viewer. Multiple video cameras at each participant's physical location create discrete images of the participants. Each viewer's physical position with respect to the display components and cameras is determined by geometric analysis of the physical arrangement of the space and/or by optional tracking sensors which determine head position.

The present eye contact collaboratory subsystem determines the location of each participant's eyes in the displayed video images with respect to every other participant and computes an appropriate image transformation to place a virtual camera coincident with the location of each participant's eyes in the displayed representation. Then, using discrete video images from multiple cameras, the system synthesizes an appropriate image for each virtual camera and transmits the synthesized images to the corresponding participants via a communication network where the image is presented on each participant's display system.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
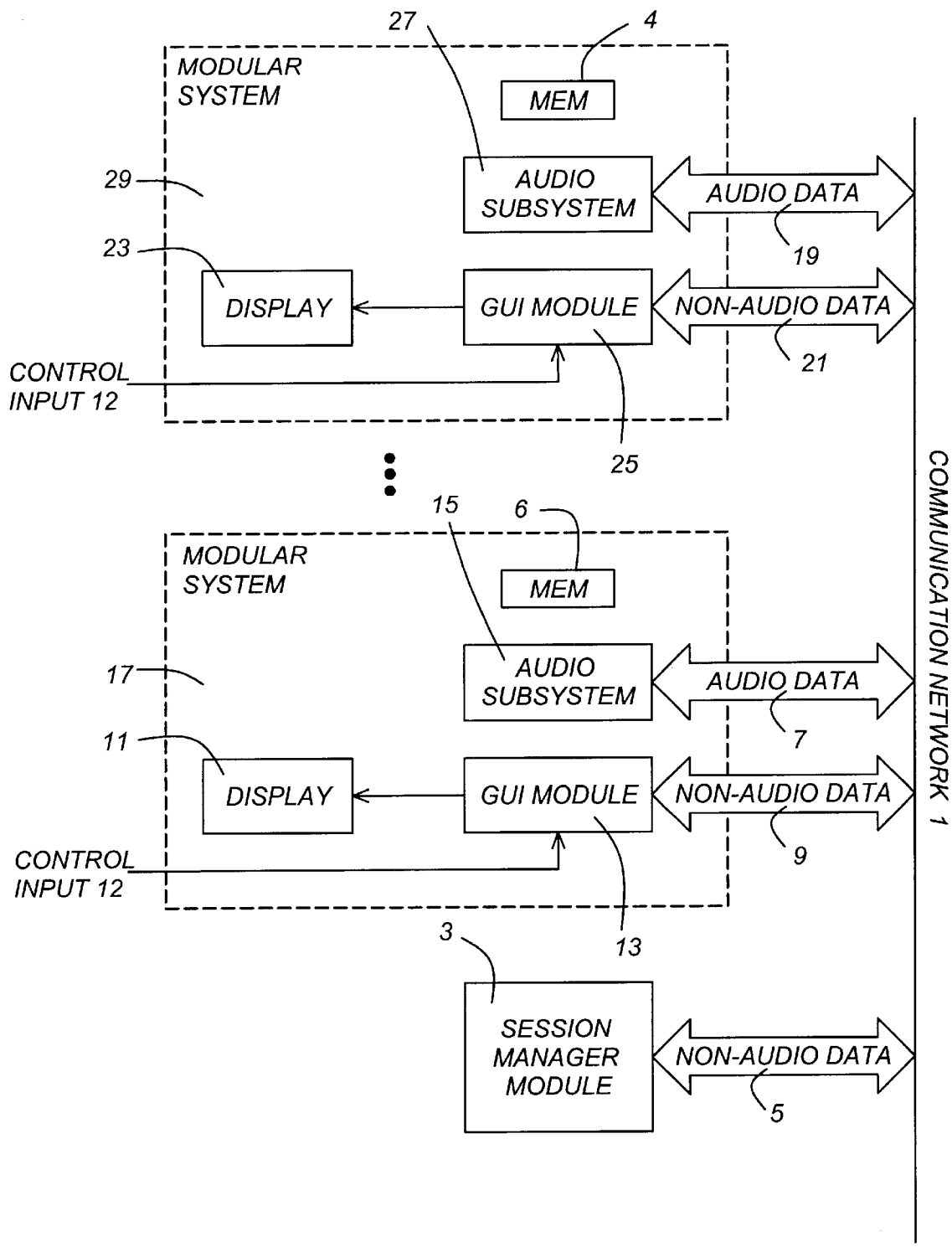
FIG. 1 is a diagram of the electronically-mediated collaboration system architecture.

In the following description, reference is made to the accompanying drawings which form a part hereof, and which is shown, by way of illustration, several embodiments of the present invention. It is understood that other embodiments may be utilized and structural changes may be made without departing from the scope of the present invention.

The collaboratory tool of the present invention displays a set of information for each user in a distributed collaboration session which may employ a variety of presentation formats and connect a group of participants, each using different sets of hardware.

Each participant is able to view visual representations of every other participant in the session are visually presented to a participant. A simple representation would be a static image or drawing of the person. The picture may also be periodically updated, for example at about 30 Hz, which is appropriate for video. A realistic or fanciful three-dimensional (3D) representation of the user's body (or "avatar") is a more complicated alternate representation. The representation may also provide information about the location of the user. For example, each user at a single site could have the same color background in their representations, making them appear as though they are in the same room.

Audio represents another element of the present invention. High-fidelity audio is a preferred implementation, although any audio of reasonable quality will produce acceptable results. The definition of "high-fidelity" depends upon the context of the collaboration session. For example, collaborations about music might require CD quality, or 44 kHz sampling. However, for collaborations that do not involve music and are strictly limited to speech, 16 KHz sampling of 16 bit samples (thus providing twice the bandwidth of standard telephones) will accurately encode what is commonly accepted to be the full spectrum of speech. One implementation of the invention uses a TCP/IP protocol to multicast each participant's speech to all other participants when a predetermined speech threshold is reached. Two or more of the participants can also elect to speak privately by moving their audio packets from the public multicast channel onto a different channel.

Identifying who is speaking at any moment is another aspect of the invention. This can be done with a visual indication or display indicator, such as changing the color of the frame on the user's image. A more natural way of conveying this information is to preserve the frequency shifts normally created by the pinna (ear flap) and other surfaces of head and chest by using a "Head-Related Transfer Function" (HRTF), or "spatializing the sound." The speech of a user can be spatialized so that it sounds as though it is co-located with the user's image. Effective spatialization may also reduce the need for visual representation.

Application sharing is yet another facet of the present invention. A shared application presents each user in a session with the same view of the same data. If one user makes a change, every user sees the change. A shared whiteboard, which allows users to draw and type text onto it, is a common example of a shared application. Some whiteboards also allow you to copy images or postscript files into them. Because the changes are instantly seen by every user, this provides an effective and efficient way to share data.

The present invention provides support for general application sharing of commercial and/or custom applications, including word processors, spreadsheets, and presentation production systems. Further, by use of a coordination plug-in, a browser can be made into a shared application, thus permitting all users to see the same web page simultaneously.

Shared cursors are another aspect of the invention. All users may share a single cursor, or each user can optionally employ a cursor that is visible to all other users. In either case, cursors should be visually associated with the user who is controlling it, either with color, or by a connecting line extending from the cursor to the user's representation, or both. This can be implemented by drawing on the overlay memory, if available, or by placing a transparent window over the screen with no mouse focus.

Finally, a coordination mechanism or session manager to synchronize the applications on each participants' workstation is necessary. This may be implemented as a server in a client-server architecture, or it could be peer-to-peer coordination.

The basic architecture of the mediated collaboration system is shown in FIG. 1. Each participant operates a modular system 17, 29 connected to a communications network 1. All audio data 7, 19 and non-audio data 5, 9, 21 is transmitted via the communications network 1. Microphone input and speaker output are provided by an audio subsystem 27, 15 within each modular system 17, 29. The audio subsystem 27, 15 includes audio hardware to transmit and receive audio data 7, 19 to other participants through the communications network 1.

The graphical user interface (GUI) module 13, 25 communicates all non-audio data 5, 9, 21 to participants via the communications network 1. The GUI module 13, 25 produces display output for the display 11, 23 which consists of the participant representations as well as the shared applications and cursors. The GUI module 13, 25 also receives control inputs 12, 24 from the user to perform presentation and enable coordination by the session manager module 3. Non-audio data 5, 9, 21 is received by the session manager module 3 and is used to synchronize and coordinate participant collaboration within the shared applications and cursors.

The modular systems 29, 17 typically comprise a computer, which generally includes, inter alia, a processor, memory 4, 6, data storage devices, data communications devices, display devices 23, 11 and/or input devices. Those skilled in the art will recognize that any combination of the above components, or any number of different components, peripherals, and other devices, may be used with the computer.

The present invention can be implemented by a computer program. Generally, the computer program comprises logic and/or data embodied in or accessible from a device, media, carrier, or signal, e.g., one or more fixed and/or removable data storage devices connected directly or indirectly to the computer, one or more remote devices coupled to the computer via the data communications devices, etc. This logic and/or data, when invoked, executed, and/or interpreted, causes the steps necessary to implement and/or use the present invention to be performed.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data performing similar functions that is embodied in or accessible from any device, carrier, media, or signal.

Of course, those skilled in the art will recognize many modifications may be made to this configuration without departing from the scope of the present invention. For example, those skilled in the art will recognize that any combination of the above components, or any number of different components, including different hardware environments, different software environments, computer programs, peripherals, and other devices, may be used to implement the present invention, so long as similar functions are performed thereby.

Figure 2:
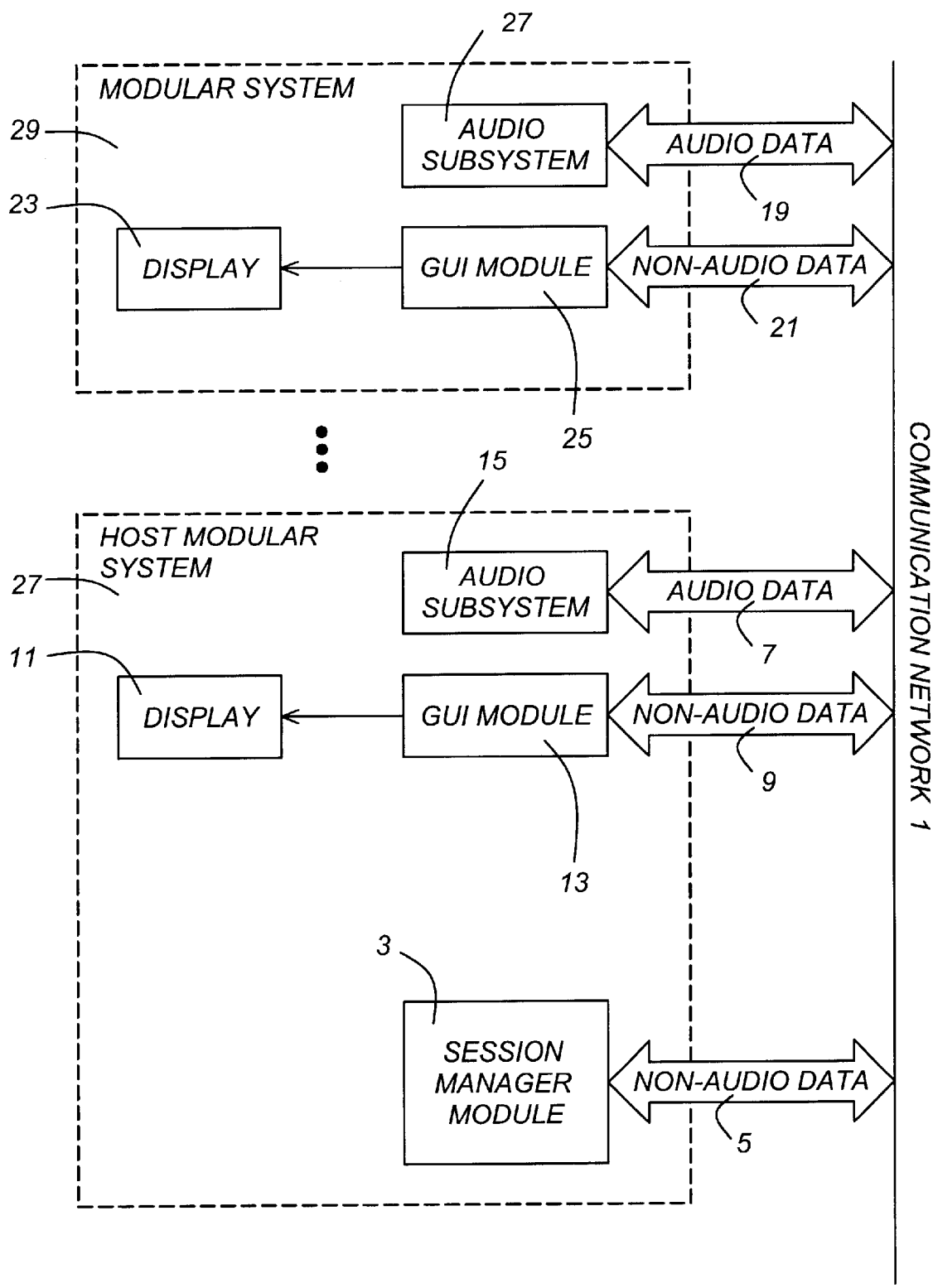
FIG. 2 is a diagram of an electronically-mediated collaboration system peer-to-peer architecture.

FIG. 2 shows an alternate architecture wherein the session manager module 3 is resident within one of the modular systems 27, 29, designated the host modular system 27. All functions of this electronically-mediated collaboration are identical to the system of FIG. 1.

Figure 3:
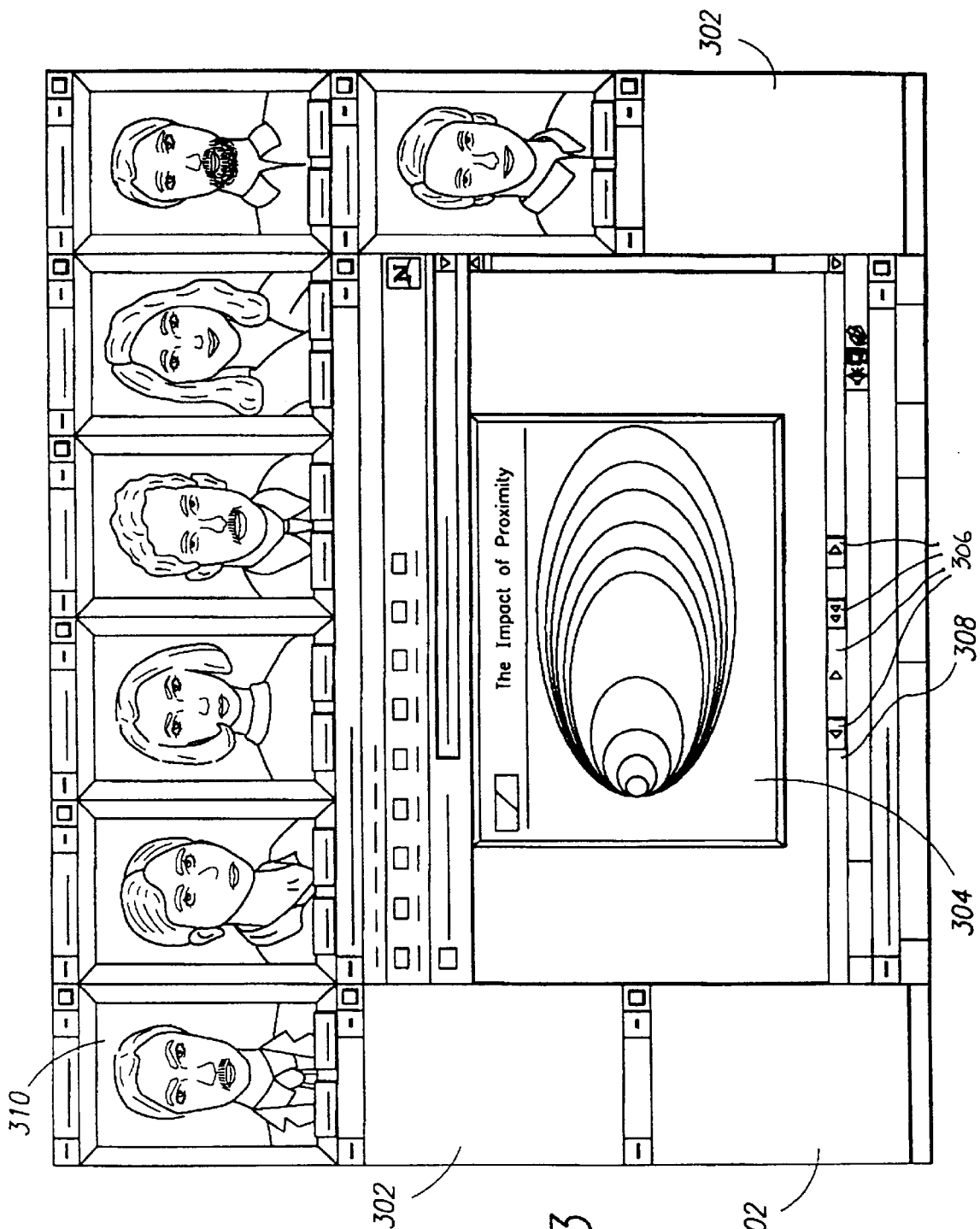
FIG. 3 is a diagram of the electronically-mediated collaboration system display in a 2D configuration.

In one display embodiment, shown in FIG. 3, blank frames 302 are used along with the participant representations 310 to give the display a uniform appearance and become filled with images as users join the collaboration session. An application window 304 presenting a shared application can be presented in the center of the display 23, 11, and can be selected by means of buttons 306 on the control strip 308 at the bottom of the screen.

Figure 4:
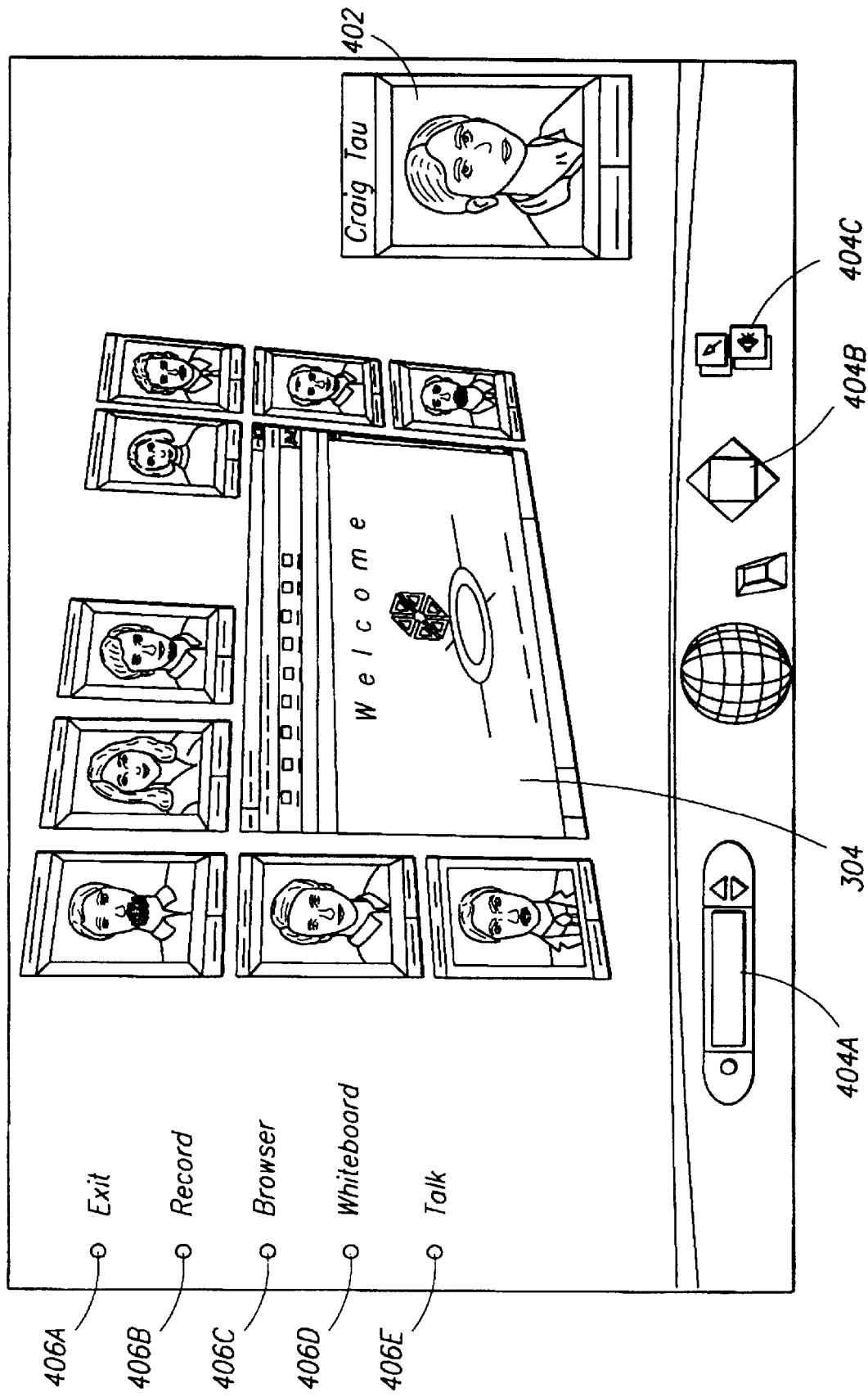
FIG. 4 is a diagram of one embodiment which uses a 3D perspective representation of the electronically-mediated collaboration system display.

FIG. 4 shows an alternate 3D configuration of participant images and shared applications to the 2D configuration of FIG. 3. Here, the "dominant speaker" is identified by an animation 402 in which the image appears to move out of the default lineup, toward the viewer. The controls 404A–404C (hereinafter collectively referred to as controls 404) at the bottom of the screen are for navigating the 3D presentation. The controls 404A–404C permit exiting a collaboration session, recording a log of interactions that occur in the session for later playback, displaying or hiding two of the shared applications (e.g. a browser and a whiteboard), and for manually causing the system to display the visual indication that the user is speaking. The controls 406A–406E on the left are part of the collaboration tool and are presented as an alternative display format for the controls 306 that are in the control strip 308 at the bottom of the 2D representation in FIG. 3.

Figure 5:
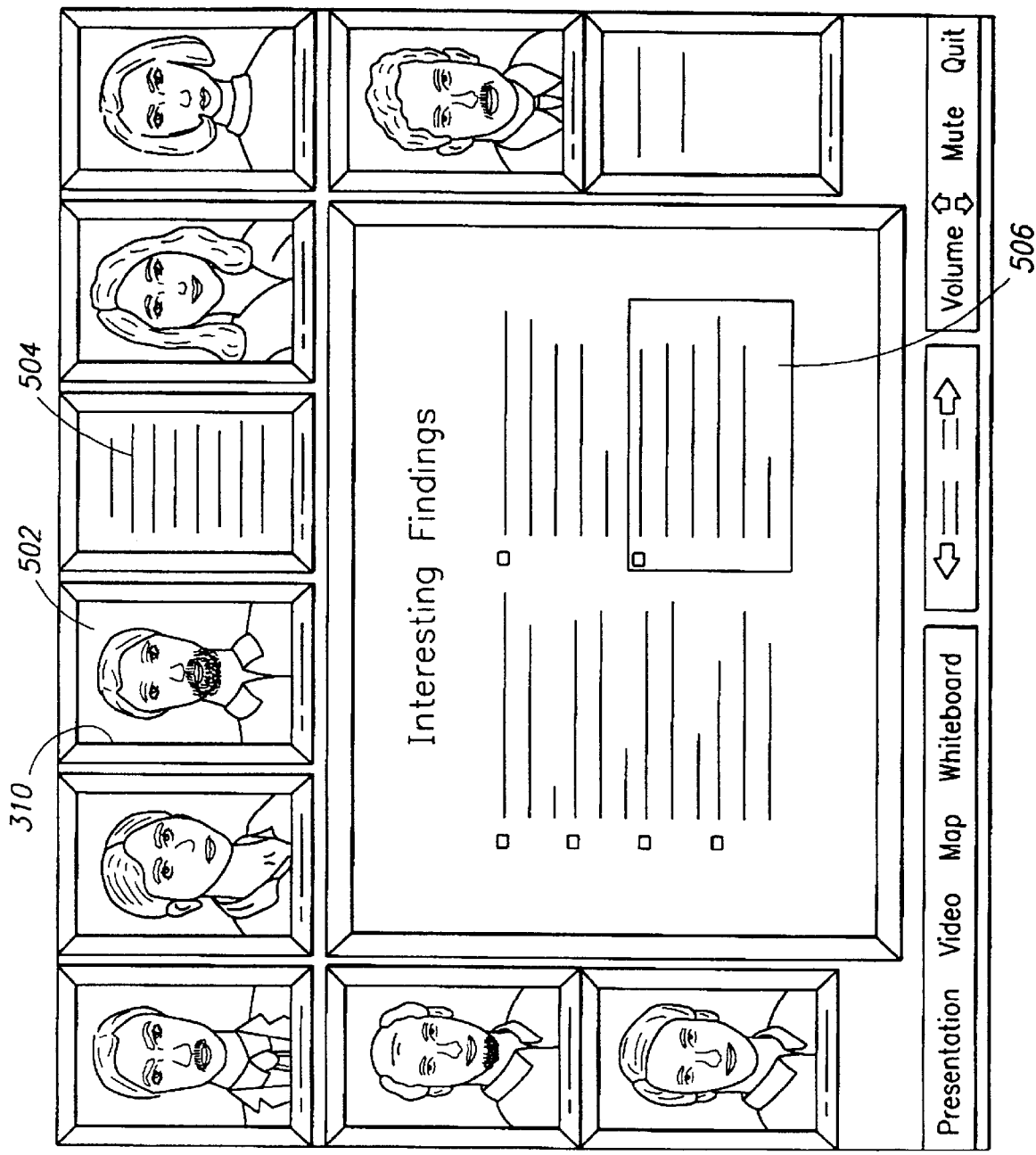
FIG. 5 is a diagram of an implementation of speaker highlighting and participant data in an electronically-mediated collaboration system display.

FIG. 5 is a diagram showing one embodiment of a display indicator. The background 502 of the active speaker's visual representation 310 is highlighted. The background 502 may be used to present other information, as well. For instance, a red background can be used to indicate that those participants are in a private conversation. A green background may be used to indicate that the participant's sound is muted, and a yellow background to indicate that the user is speaking. Also, as shown in the FIG. 5, a participant's image can be replaced, if desired, by presenting a window or frame 504 data describing the participant. Further, the participant can highlight data using a yellow transparent annotation 506.

Figure 6:
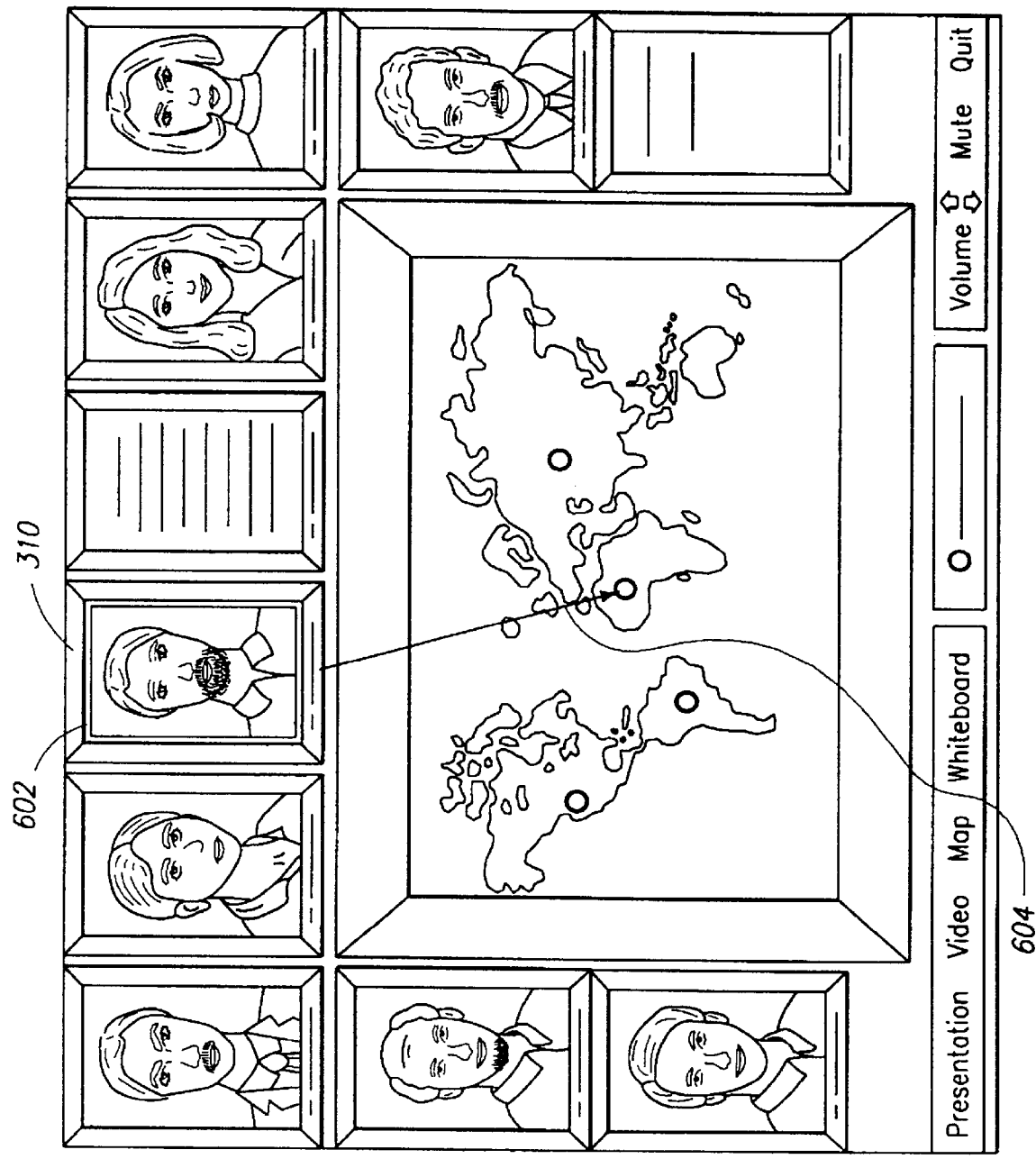
FIG. 6 is a diagram of an implementation of speaker highlighting using colored frames instead of backgrounds.

FIG. 6 is a diagram showing another embodiment of a display indicator. In this embodiment, a colored frame 602 is used to denote the active speaker, instead of or in addition to the colored backgrounds shown in FIG. 5. A shared cursor 604 may also be depicted, and the shared cursor 604 may be identified with the participant controlling the cursor 604 by a line or other element extending from the representation of the controlling participant 310 to the cursor 604.

Figure 7:
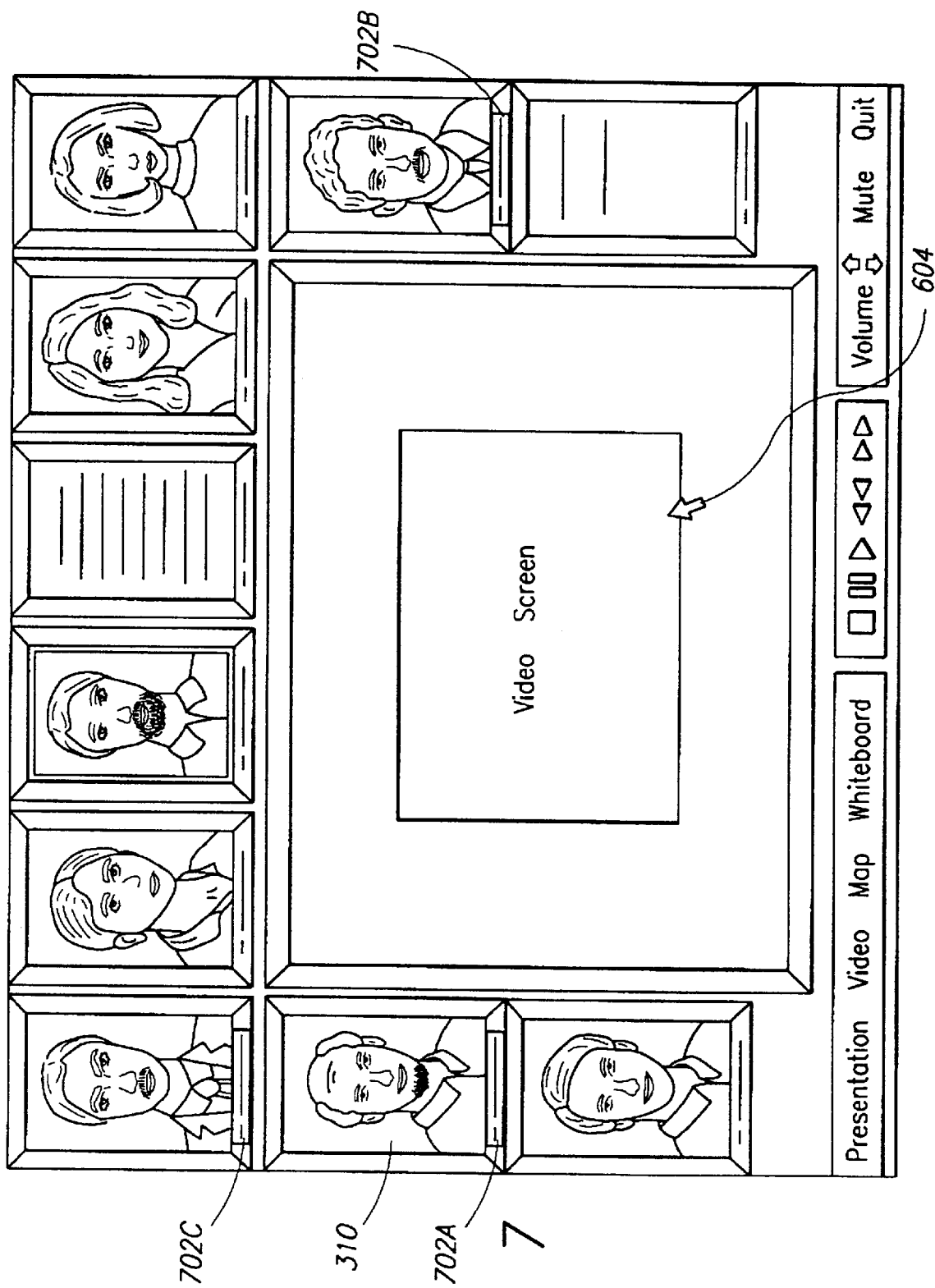
FIG. 7 is a diagram of another option for speaker highlighting in which just the speakers' names are colored.

FIG. 7 is a diagram showing another embodiment of the display indicator. In this embodiment, the representation includes the participant's name, which includes highlighting 702A–702C. In this embodiment, different colors can be used to identify the active participants and to identify which participant is controlling the shared cursor.

Figure 8:
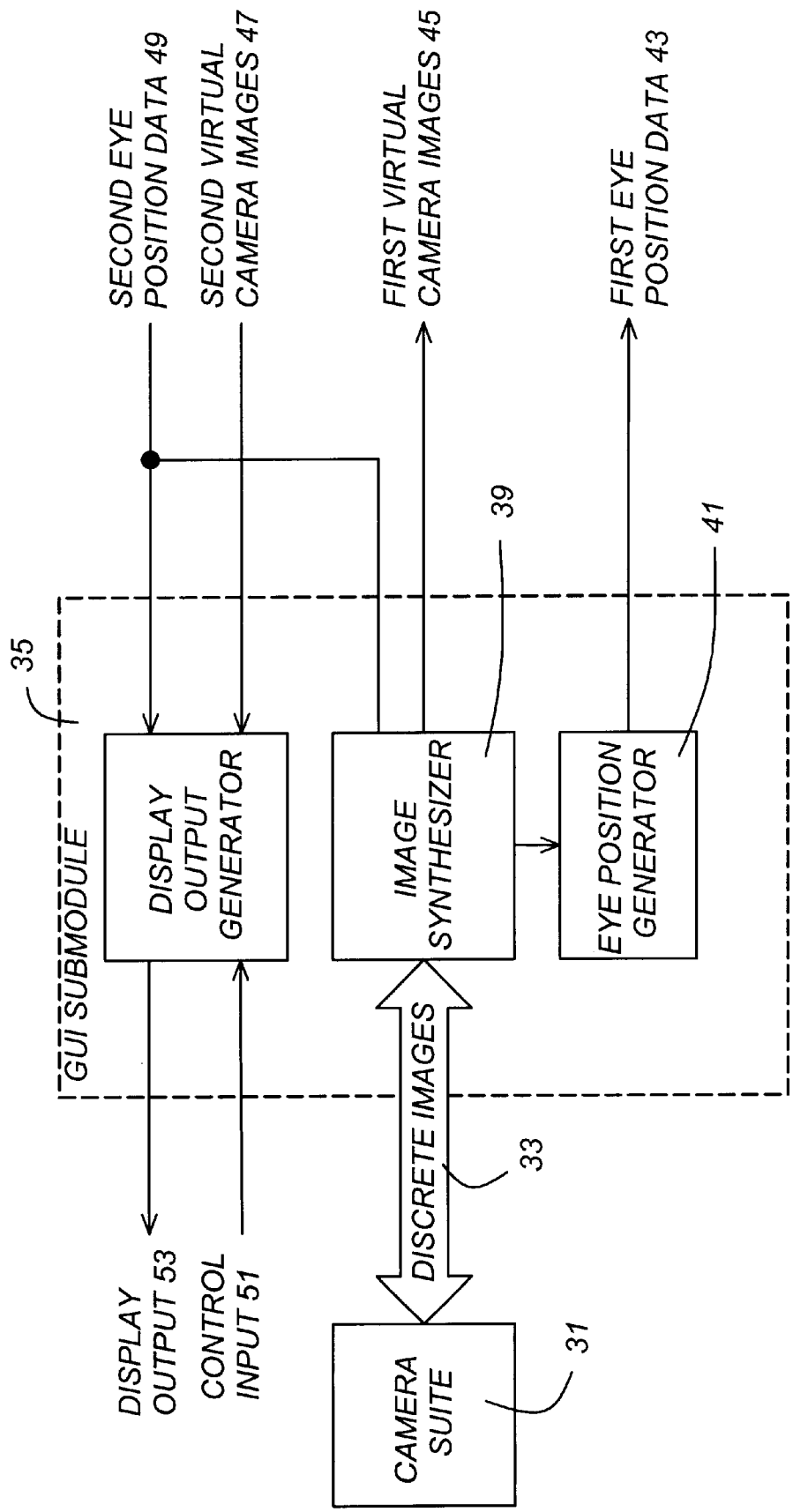
FIG. 8 is a diagram of the system architecture of an eye contact collaboratory.

FIG. 8 is a block diagram of one embodiment of the eye contact collaboratory system, as implemented for each participant. The eye contact collaboratory subsystem enables participants in a virtual collaboration session to make eye contact with other participants. This optional feature enhances the capabilities of the system. A camera suite 31 records a discrete image 33 of a participant for each camera and transmits these images to a GUI submodule 35 within the GUI module 13, 25. In one embodiment, the camera suite 31 comprises at least two cameras for recording different perspectives of the participant. In another embodiment, a single camera is used to record the different perspectives. This can be accomplished, by use of mirrors, fiber optics or other image-redirecting devices. For example, a mirror system can be used to provide a single camera with alternating perspectives of the participant from different locations.

The GUI submodule 35 uses the discrete images 33, control inputs 51 and second eye position data 49 from other participants to synthesize first virtual camera images 45 of the participant corresponding to virtual camera locations substantially coincident with the eye positions of the video representations of the other participants. Additional information, such as video window size and location on the viewing user's display may also be used. Further, the eye position generator 41 determines the first eye position data 43 from the position of the eyes of the participant in each of the first virtual camera images 45. The first virtual camera images 45 and first eye position data 43 are transmitted to the other participants through the communications network 1. Algorithms and methods for execution of the image processing and software functions may be selected from any number of approaches presently available and known to those skilled in the art.

Each participant defines representation locations for the individual video representations of the other participants using control inputs 51. Incoming second virtual camera images 47 and second eye position data 49 from the other participants are received by the GUI submodule 35 from the communications network 1. The participant's defined representation locations from control inputs 51 are applied to the second eye position data 49 and then combined with the second virtual camera images 47 by the display output generator 37 to create the display output 53 for the participant.

Figure 9:
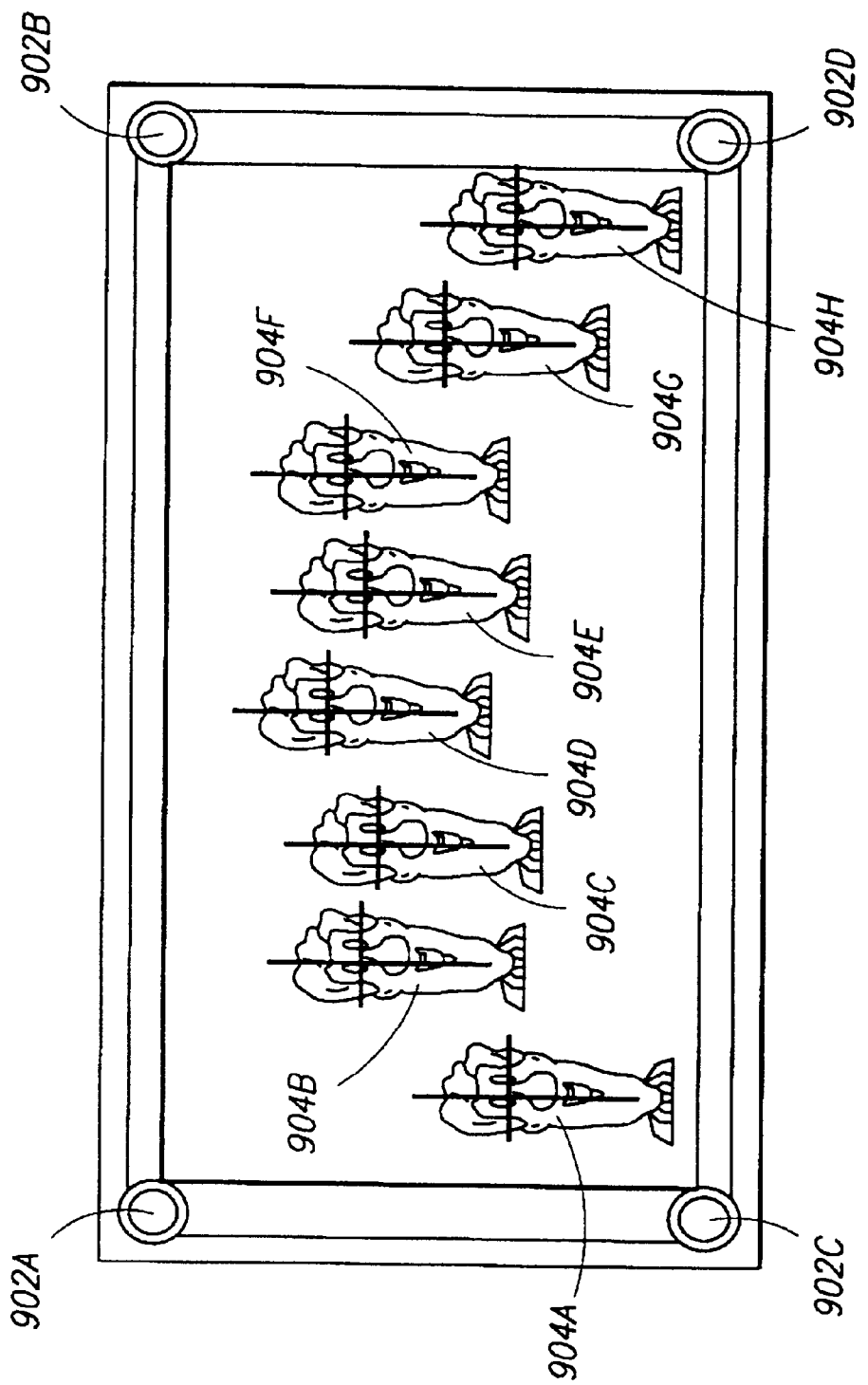
FIG. 9 is a diagram of the eye contact collaboratory implementation.
Figure 10:
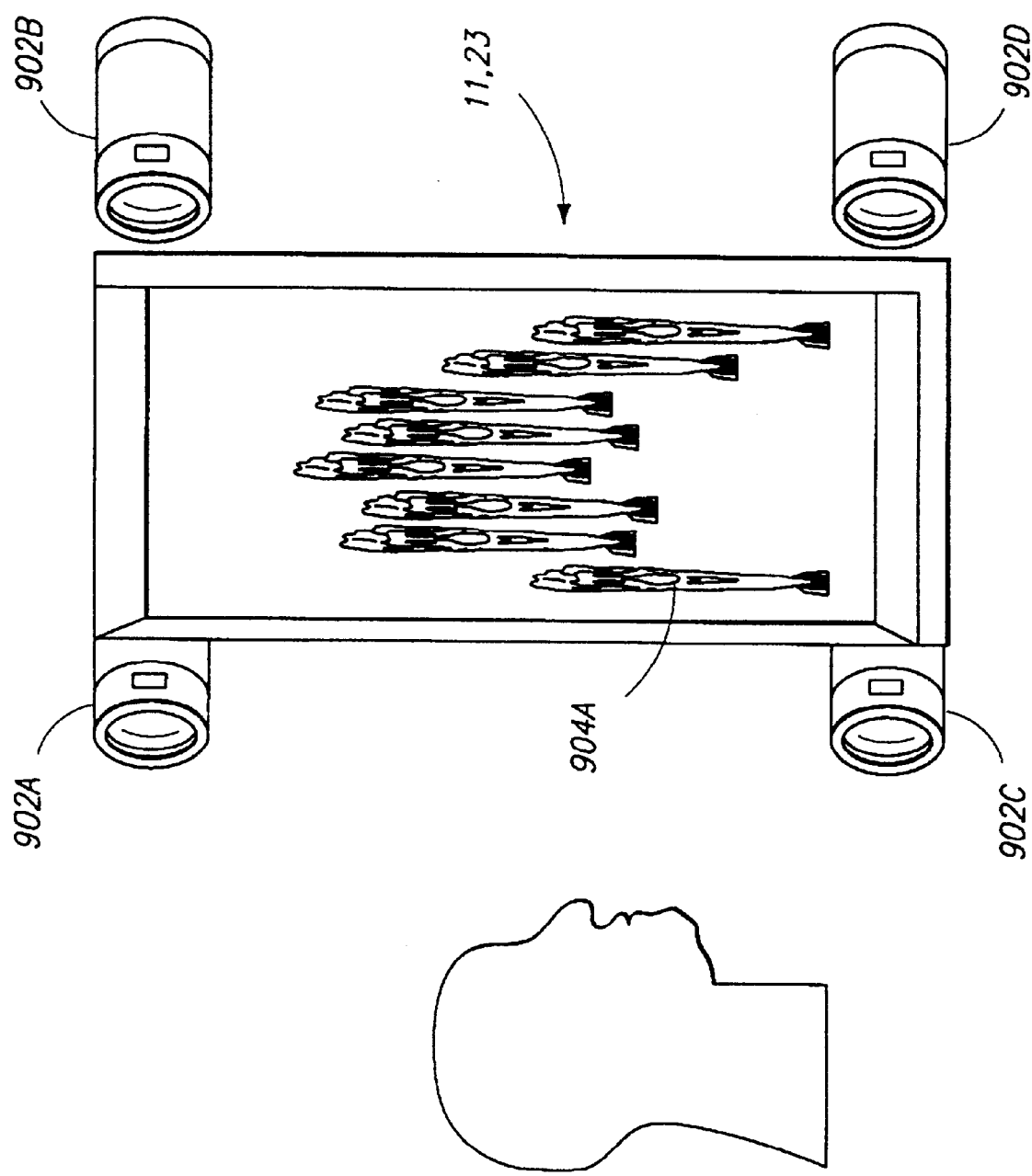
FIG. 10 is a perspective view of an eye contact collaboratory with a collaboratory participant present.

FIGS. 9 and 10 are diagrams illustrating an embodiment of the eye contact collaboration aspects of the invention.

FIG. 9 illustrates eight participants represented at arbitrary locations on the display 11, 23. Four cameras 902A–902D are located proximate the corners of the display. The crosshairs 904A–904H, indicate both the transmitted location of the eyes of each participant (with respect to the transmitted video input) and the desired location of the virtual cameras (with respect to the display), defining the perspective for which images must be synthesized from the video input from two or more of the cameras 902A–902D.

FIG. 10 shows a perspective view with the viewing participant present.

Two or more cameras provide independent, discrete views of the participant (typically, the participant's face) as video input. It is expected that the number of cameras 902A–902D needed will increase with increasing display 11, 23 size. Beyond a certain display 11, 23 size (which can be empirically determined), it is likely that cameras 902A–902D will need to be placed within the display 11, 23 field of view (though hidden from the viewer). This can be easily accomplished by using certain forms of collimated or projection display technology (where the display surface receives imagery from an optical pathway involving curved or flat fold mirrors). Cameras 902A–902D may be virtually placed in or behind the display surface using half silvered mirrors and fold mirrors or, in the case of highly reflective display surfaces, images of the subject face may be captured directly as they are reflected from the display surface.

Video cameras 902A–902D (analog and digital) are steadily dropping in price, improving in quality and becoming miniaturized. However, there may be cost and space concerns which demand consideration of a number of options. One possible approach to camera cost and size reduction would be to utilize only one color camera and provide small monochrome cameras for the remainder of the camera suite 31. This would require additional image processing to correctly color render the synthesized images.

Using two or more discrete video images from physical video cameras 904A–904D, images are synthesized for arbitrary locations of virtual cameras within the display field-or-view of the eye contact collaboratory. The synthesis of new images from a different viewing point given a set of existing images from known viewing points may be accomplished by a number of image interpolation techniques, including that described in McMillan, L. & Bishop, G., "Plenoptic Modeling: An Image-Based Rendering System," which is hereby incorporated by reference herein. In addition, it may be necessary to apply image compression algorithms to the resulting image to ensure efficient operation of the overall system. Combining image interpolation techniques with image compression techniques may be more efficient than applying each independently.

Tracking eyes in video images can be accomplished by a number of different existing techniques, including that of Stiefethagen, R., Ynag, J., & Waibel, A., "Tracking Eyes and Monitoring Eye Gaze," Workshop on Perceptual User Interfaces, Banff, Canada, 1997, which is hereby incorporated by reference herein. The type of technique described in the reference cited below suffers from the difficulties inherent in tracking an element in a display that may dramatically change appearance from frame to frame. With eyes, such difficulties occur with movement of the eyelids, blinking and various reflection artifacts associated with glasses and contact lenses. Therefore, it is desirable to add a more robust technique for fixing the approximate position and orientation of the face in space in order to deal with instances of uncertainty in the basic eye tracking algorithms. It has been shown (by E. Petajan and others) that tracking nostrils provides such a robust metric. Other tracking methods (e.g. face tracking and/or eye tracking) can be used in addition to nostril tracking, if desired.

If a particular implementation of an eye contact collaboratory involves a very large display 11, 23 field of view or allows the participant viewer to move around significantly, it may be necessary to incorporate more robust tracking techniques such as optical eye trackers and magnetic head trackers. Such technologies are readily available, though currently quite expensive. Alternatively, some implementations may demonstrate that the human eye is not sensitive to certain inaccuracies in estimating eye positions and thus highly accurate eye position determination is not required. In that case, it may be adequate to estimate eye position using only the nostril tracking technique with a straightforward offset correction for eye-nose separation.

The eye contact collaboration system enables participants in virtual collaboration sessions using video representations to make eye contact with other participants. It is designed for a single viewer at each participant site.

The system determines the location of each participant's eyes in the displayed video images with respect to each viewer and computes an appropriate image transformation to place a virtual camera coincident with each participant's eyes. Then, using discrete video images from multiple cameras, it synthesizes an appropriate image for each virtual camera and transmits the synthesized images to the corresponding participants via a communication network. Finally, the system displays the images so received on each participant's display system.

Alternatives or extensions to the most basic configuration of the eye contact collaboratory may address a number of desirable system enhancements. By including a collimated display system which uses mirrors as the display surface it would be possible to incorporate cameras into the main display field to enhance two aspects of the system, enlarge the field of view substantially and, with the addition of face tracking software, allow multiple viewers to use the system simultaneously. It may be desirable to reduce the number of image pixels being sent around the network by moving the image processing of the final viewer-specific virtual camera image of each other participant to the recipient's modular system. A singe virtual camera image from each participant is sent to all other participants. Each viewer participant's computer would then interpolate the final viewer-specific virtual camera image locally. This approach may save substantially on network load. The impact on the image processing computational load will depend on the particular algorithmic implementation and efficiencies that can be achieved in producing the display output directly from the virtual camera image input from other participants compared with synthesizing first virtual camera images from discrete images before transmitting to all other participants.

It is anticipated that numerous system configurations will be successful, leading to a range of product options at various performance, functional capability and price points. At any given time a range of options may be provided to customers tailored to their application and budget, with the entire line of products evolving steadily toward higher performance and function as computing infrastructures and networks evolve to meet demands for higher performance at lower cost. In addition, component-level innovations in display technology, image processing algorithms, cameras and sensors will enhance functional performance of eye contact collaboratory systems.

Figure 11:
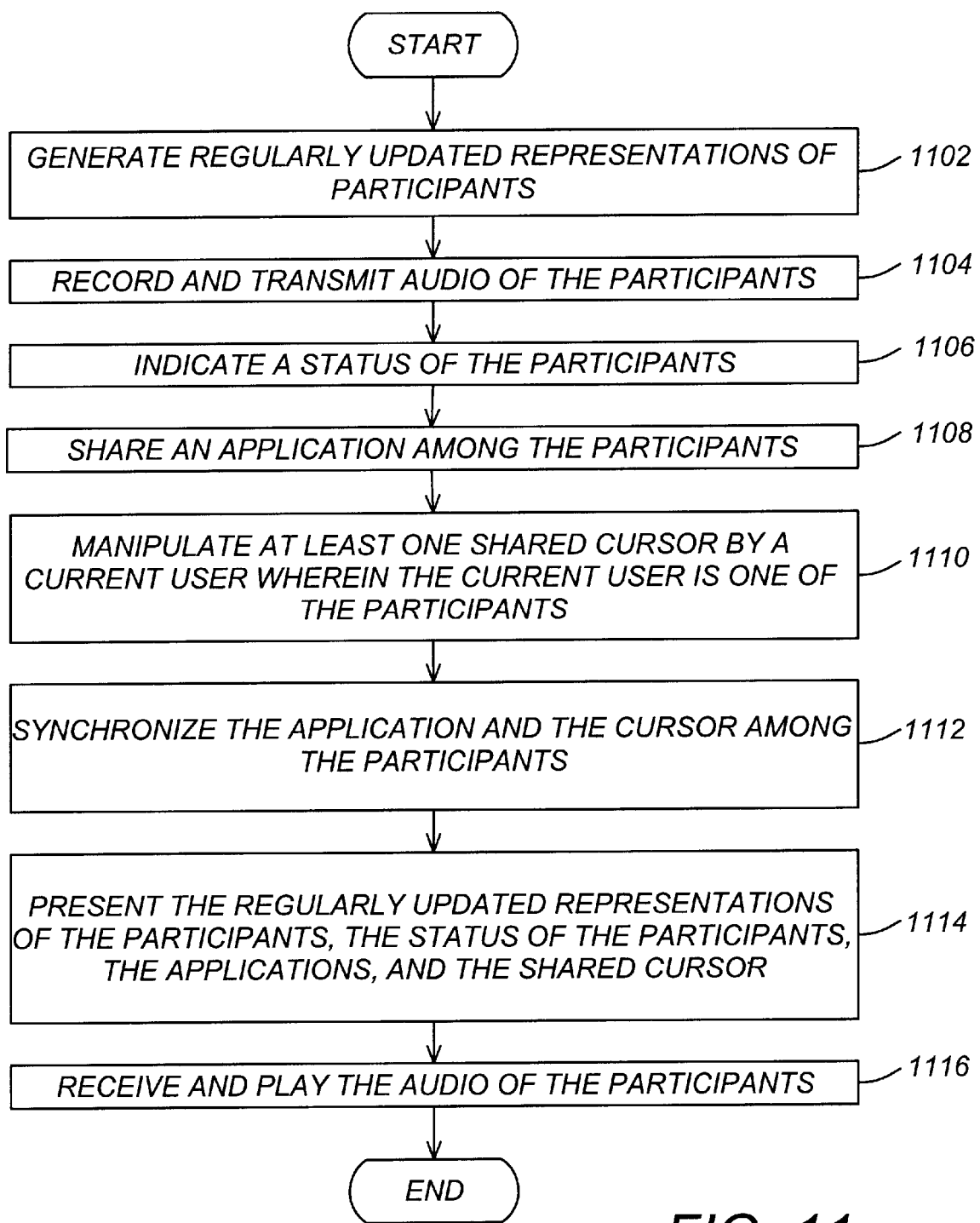
FIG. 11 is a flow chart depicting exemplary steps used to practice one embodiment of the present invention.

FIG. 11 is a flow chart depicting exemplary steps used to practice one embodiment of the collaboratory system. Regularly updated representations of participants are generated 1102. Audio of the participants is recorded and transmitted, as shown in block 1104. A status of the participants may also be indicated, as shown in block 1106. An application may also be shared among participants, as shown in block 1108. A shared cursor 604 may be manipulated by one of the participants designated as a current user, and the application and the cursor is synchronized among the participants, as shown in blocks 1110 and 1112. Regularly updated representations of the participants, the status of the participants, the applications, and the shared cursor are also presented 1114. Audio of the participants may also be received and played, as shown in block 1116. As will be appreciated by those skilled in the art, the operations depicted in blocks 1102–1116 need not be performed in the order depicted. In fact, the depicted operations may be performed in parallel by separate applications.

Figure 12:
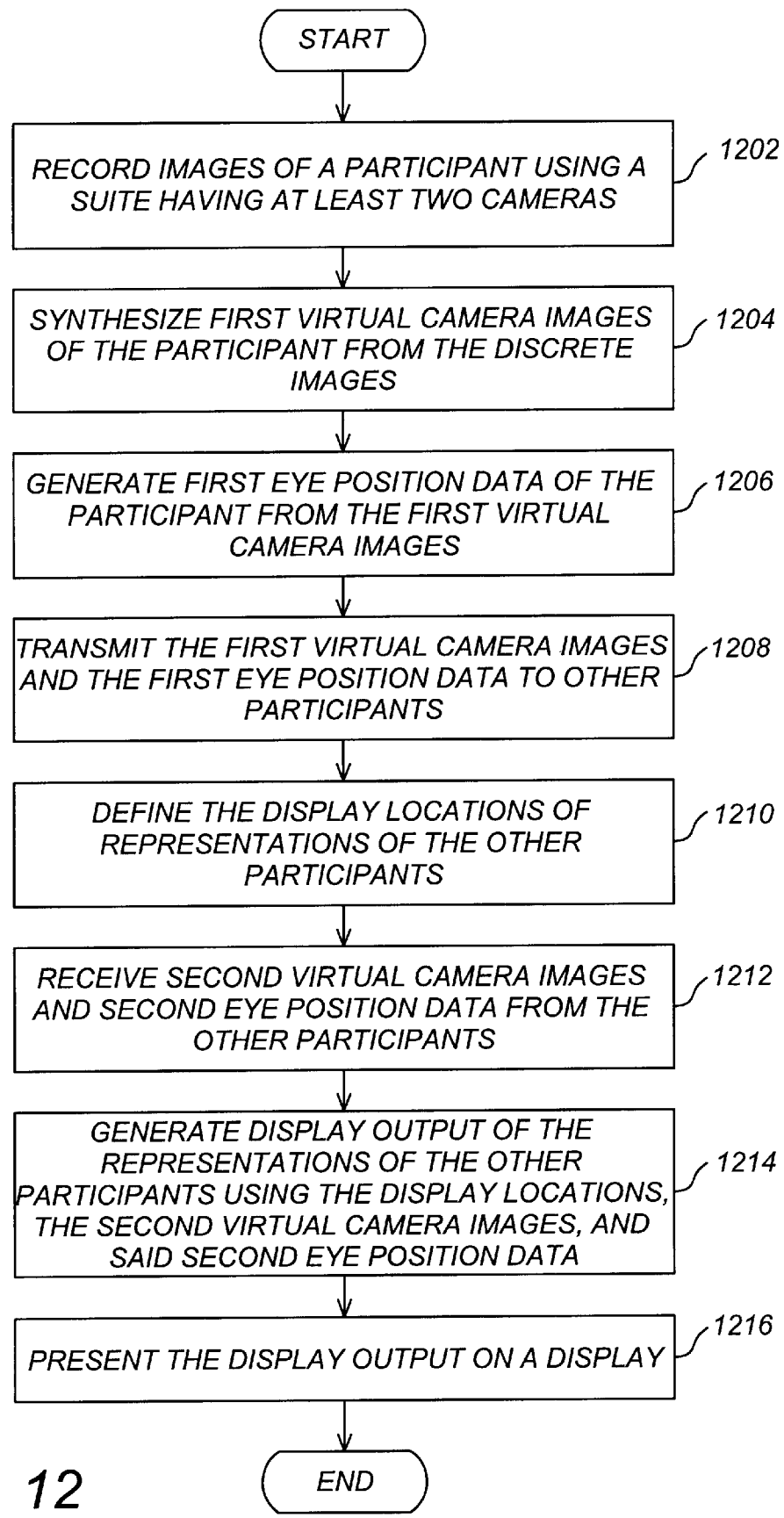
FIG. 12 is a flow chart depicting exemplary steps used to practice an eye-contact collaboratory embodiment of the present invention.

FIG. 12 is a flow chart depicting exemplary steps used to practice an eye-contact collaboratory environment of the present invention. Images of the participant are recorded using a suite 33 having at least two cameras 902. First virtual camera images 45 of the participant are synthesized 1204 from the images. First eye position data 43 of the participant is generated 1206 from the first virtual camera images 45. The generated first virtual camera images 45 and the first eye position data 43 are then transmitted 1208 to other participants. Display locations of representations of other positions are defined, as shown in block 1210.

Second virtual camera images 47 and second eye position data 49 are received 1212 from other participants, and a display output of representations of the other participants is generated 1214 and presented 1216 on a display. This is accomplished using the display locations, the second virtual camera images 47, and the second eye position data 49.

It is noted that the generation of the eye position from the virtual images can be implemented as a continuing iterative process. Further, estimates of the eye position from both users can be used to obtain initial eye estimates to create synthesized images.

Figure 13:
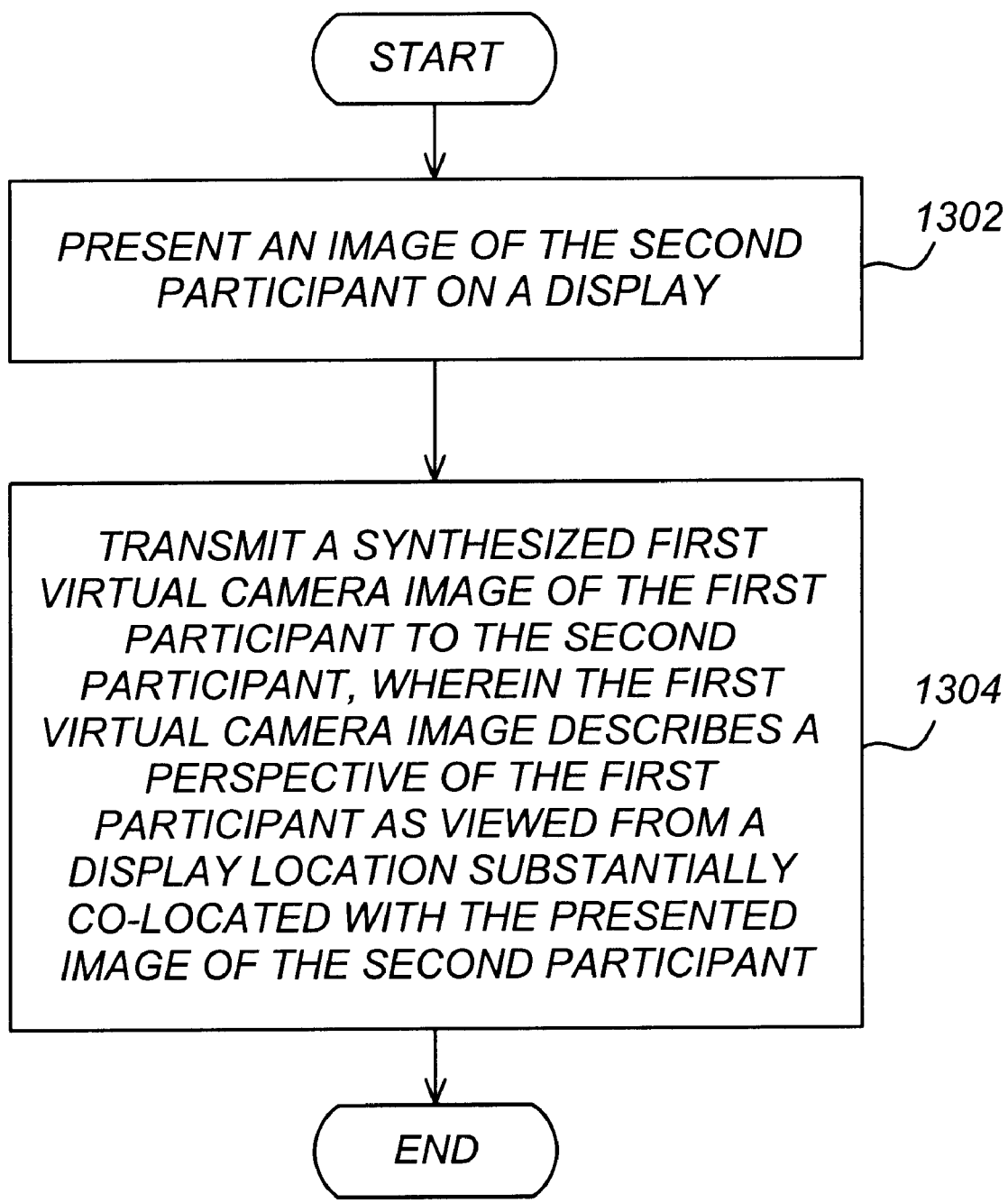
FIG. 13 is a flow chart depicting exemplary steps used to practice a second embodiment of an eye-contact collaboratory.

FIG. 13 is a flow chart depicting exemplary steps used to practice a second embodiment of an eye-contact collaboratory. An image of the second participant is presented 1302 on a display. A synthesized first camera image 45 of the first participant (which describes a perspective of the first participant as viewed from a display location substantially co-located with the presented image of the second participant) is transmitted 1304 to the second participant.

Conclusion

This concludes the description of the preferred embodiments of the present invention. In summary, the present invention describes a method, apparatus, and article of manufacture for electronically-mediated collaboration between participants.

The apparatus comprises at least two modular systems, communicating with each other, each one of which is usable by a participant, and a session manager module for synchronizing and coordinating the communication of non-audio data between the modular systems. Each modular system comprises a graphical user interface module for communicating the non-audio data to one of the other modular systems, an audio subsystem, for receiving audio and transmitting audio to an audio system in another modular system, and a display, for presenting non-audio data to the participant.

The method comprises the steps of presenting an image of a second participant on a display, and transmitting a synthesized first virtual camera image of the first participant to the second participant. The first virtual camera image describes a perspective of the first participant as viewed from a display location substantially co-located with the presented image of the second participant. The article of manufacture comprises a media tangibly embodying logic for performing these method steps.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electronically-mediated collaboration system, comprising:
   at least two modular systems communicating with each other, each one of said modular systems usable by a participant and including:
      a graphical user interface (GUI) module for communicating non-audio data to a said other one of said modular systems;
      an audio subsystem for receiving audio from and transmitting audio to an audio subsystem in said other one of said modular systems;
      a display for presenting non-audio data to said participant;
      wherein the non-audio data includes a representation of each said participant and a shared cursor visually associated with the representation of a current cursor user; and
   a session manager module for synchronizing and coordinating communication of non-audio data between said modular systems
   wherein each one of said modular systems usable by each said participant further includes an eye contact collaboratory subsystem, the eye contact collaboratory system comprising:
   at least two GUI submodules communicating with each other, each one of said GUI submodules usable by the participant and including:
      a camera suite having at least one camera for recording video input of discrete images of said participant representing at least two perspectives of said participant;
      an image synthesizer for synthesizing first virtual camera images from said discrete images of said participant and transmitting said first virtual camera images to said other said GUI submodules; and
      an eye position generator for generating first eye position data of said participant from said virtual camera images of said participant and transmitting to said other said GUI submodules; and
      a display output generator for generating display output of other participants for said participant using second virtual camera images from said other said GUI submodules, second eye position data from said other said GUI submodules and control inputs from said participant.

2. The system of claim 1, wherein said session manager module is implemented within one of said modular systems, said one of said modular systems being a host modular system.

3. The system of claim 1, wherein said audio subsystem comprises audio hardware for receiving audio input and providing audio output.

4. The system of claim 3, wherein said audio subsystem provides a bandwidth in the order of at least twice the bandwidth of a standard telephone.

5. The system of claim 3, wherein said audio subsystem uses a plurality of audio channels selectable by said participant.

6. The system of claim 3, wherein said audio subsystem uses spatialized audio.

7. The system of claim 1, wherein said at least one shared cursor is associated by color to said representation of said current cursor user.

8. The system of claim 1, wherein said at least one shared cursor is associated by a connecting line extending from said at least one shared cursor to said representation of said current cursor user.

9. The system of claim 1, wherein said non-audio data includes a two dimensional display.

10. The system of claim 1, wherein said non-audio data includes a three dimensional display.

11. The system of claim 1, wherein said representations of said each said participant are updated at approximately 30 Hz.

12. The system of claim 1, wherein said non-audio data further includes a display indicator for identifying status of said each said participant.

13. The system of claim 12, wherein said display indicator uses a color change to said representation of an active speaker.

14. The system of claim 12, wherein said display indicator uses a position change to said representation of an active speaker.

15. The system of claim 12, wherein said display indicator uses the same background color for said representation of said each said participant from the same site.

16. The system of claim 12, wherein said display indicator displays data describing said participants.

17. The system of claim 1, wherein each one of said modular systems usable by each said participant further includes an eye contact collaboratory subsystem.

* * * * *